United States Patent
Mahkonen et al.

(10) Patent No.: US 8,942,246 B2
(45) Date of Patent: Jan. 27, 2015

(54) METHOD AND AN APPARATUS FOR PROVIDING CONFIGURATION INFORMATION TO A MOBILE TERMINAL

(75) Inventors: Heikki Mahkonen, Helsinki (FI); Tero Kauppinen, Espoo (FI); Martti Kuparinen, Masala (FI); Mats Sjöberg, legal representative, Huddinge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 274 days.

(21) Appl. No.: 13/148,515

(22) PCT Filed: Feb. 13, 2009

(86) PCT No.: PCT/EP2009/051732
§ 371 (c)(1),
(2), (4) Date: Jan. 31, 2012

(87) PCT Pub. No.: WO2010/091735
PCT Pub. Date: Aug. 19, 2010

(65) Prior Publication Data
US 2012/0195232 A1    Aug. 2, 2012

(51) Int. Cl.
*H04L 12/56* (2006.01)
*H04L 29/12* (2006.01)
*H04W 8/26* (2009.01)
*H04W 80/04* (2009.01)

(52) U.S. Cl.
CPC ...... *H04L 61/2015* (2013.01); *H04L 29/12311* (2013.01); *H04L 29/12811* (2013.01); *H04L 29/1282* (2013.01); *H04L 61/2084* (2013.01); *H04L 61/6009* (2013.01); *H04L 61/6013* (2013.01); *H04W 8/26* (2013.01); *H04W 80/04* (2013.01)
USPC .......................................................... 370/401

(58) Field of Classification Search
CPC ............ H04L 61/2015; H04L 61/6009; H04L 61/2084
USPC .................................................. 370/255, 401
See application file for complete search history.

(56) References Cited

U.S. PATENT DOCUMENTS 7,953,044 B2 * 5/2011 Xia et al. ...................... 370/331
2004/0259532 A1 * 12/2004 Isomaki et al. ............ 455/412.1
(Continued)

OTHER PUBLICATIONS

International Search Report and Written Opinion corresponding to PCT Application No. PCT/EP2009/051732, Date of Mailing: Feb. 23, 2010.
(Continued)

*Primary Examiner* — Dang Ton
*Assistant Examiner* — Kevin Lee
(74) *Attorney, Agent, or Firm* — Myers Bigel Sibley & Sajovec, P.A.

(57) ABSTRACT

A method and a Mobile Access Gateway (MAG) node for use in an IP network. The MAG node comprises a server for providing configuration information. The server includes a memory for storing configuration information, and a processing unit configured to generate a request for configuration information associated with a mobile terminal that has attached to the network. The server caches the configuration information in the server memory, and includes one or more items of configuration information from the cached information in a message to be sent to the mobile terminal.

29 Claims, 3 Drawing Sheets

(56) References Cited

U.S. PATENT DOCUMENTS

| | | | |
|---|---|---|---|
| 2007/0002833 A1 | 1/2007 | Bajic | |
| 2007/0147299 A1* | 6/2007 | Ando et al. | 370/331 |
| 2010/0067446 A1* | 3/2010 | Oulai et al. | 370/329 |
| 2010/0272062 A1* | 10/2010 | Velev et al. | 370/331 |
| 2010/0280961 A1* | 11/2010 | Thyni | 705/80 |
| 2011/0116513 A1* | 5/2011 | Gilson | 370/469 |

OTHER PUBLICATIONS

Gundavelli et al. "Proxy Mobile IPv6" Network Working Group, Request for Comments: 5213, Category: Standards Track, pp. 1-90, Aug. 1, 2008.

Korhonen et al. "Diameter Proxy Mobile IPv6: Support for Mobile Access Gateway and Local Mobility Anchor to Diameter Server Interaction" Diameter Maintenance and Extension (DIME), Internet Draft, Intended status: Standards Track, pp. 1-21, Jan. 14, 2009.

R. Droms "Dynamic Host Configuration Protocol" Network Working Group, Request for Comments: 2131, Obsoletes: 1541,Category: Standards Track, pp. 1-40, Mar. 1997.

R. Droms, Ed.et al. "Dynamic Host Configuration Protocol for IPv6 (DHCPv6)" Network Working Group, Request for Comments: 3315, Category: Standards Track, pp. 1-89, Jul. 2003.

S. Alexander et al. "DHCP Options and BOOTP Vendor Extensions" Network Working Group, Request for Comments: 2132, Obsoletes: 1533, Category: Standards Track, pp. 1-30, Mar. 1997.

S. Gundevelli, Ed. et al. "Proxy Mobile IPv6" Network Working Group, Request for Comments: 5213, Category: Standards Track, pp. 1-92, Aug. 2008.

S. Thomson et al. "IPv6 Stateless Address Autoconfiguration" Network Working Group, Request for Comments: 2462, Obsoletes: 1971, Category: Standards Track, pp. 1-25, Dec. 1998.

* cited by examiner

METHOD AND AN APPARATUS FOR PROVIDING CONFIGURATION INFORMATION TO A MOBILE TERMINAL

CROSS REFERENCE TO RELATED APPLICATION

This application is a 35 U.S.C. §371 national stage application of PCT International Application No. PCT/EP2009/051732, filed on 13 Feb. 2009, the disclosure and content of which is incorporated by reference herein in its entirety. The above-referenced PCT International Application was published in the English language as International Publication No. WO 2010/091735 A1 on 19 Aug. 2010.

TECHNICAL FIELD

The present invention relates to a method and an apparatus for providing configuration information to a mobile terminal in a telecommunication network. More particularly, the invention relates to providing Dynamic Host Configuration Protocol (DHCP) information from a Mobile Access Gateway (MAG).

BACKGROUND

The 3GPP group has specified a protocol known as the GPRS Tunneling Protocol (GTP), which is intended to provide a mechanism for the mobility management of packet data traffic associated with mobile terminals. GTP is implemented between an IP anchor point and an IP access point within the GPRS core network. A primary role of the anchor point is the allocation of IP addresses to mobile user equipment (UE) terminals (from a fixed pool of addresses). An IP address is allocated to a UE for the duration of a session. The access point is responsible for registering the current location of a UE with an anchor node to allow the anchor node to tunnel packets to a UE having an IP address allocated to it.

A parallel mobility protocol known as Proxy Mobile IP (PMIP) has been specified by the 3GPP Internet Engineering Task Force, IETF (see draft-ieff-netImmproxymip6-06.txt) in order to allow GTP-like functionality to be introduced to other packet data networks, e.g. CDMA2000-based networks. PMIP refers to the anchor point as a "Local Mobility Anchor" (LMA) and to the access point as a "Mobility Access Gateway" (MAG).

PMIPv6 protocol enables legacy UEs to retain connectivity to the Internet and other nodes with the same IP address while moving between access networks [see "Proxy Mobile IPv6", S. Gundavelli, IETF Request for Comments 5213]. The home operator's LMA assigns an IPv4 Home Address (HoA) or an IPv6 Home Network Prefix (HNP) for the UE and these addresses are transmitted to the UE via the MAG. As shown in FIG. 1, when at step 101 a UE 10 attaches to an access network, a MAG 12 in that access network registers with the LMA 14 of the UE by exchanging with the LMA 14 a Proxy Binding Update (PBU) message at step 102 and a Proxy Binding Acknowledgement (PBA) message at step 103. In these messages the MAG 12 learns the IPv4 HoA and the IPv6 HNP of the UE 10. Both the MAG 12 and the LMA 14 also set up routing for the HoA and HNP of the UE 10 so that the traffic flows from/to the UE 10 inside a bi-directional tunnel between the MAG 12 and the LMA 14.

After the UE 10 has attached to the access network and the MAG 12 has registered the UE 10 with the LMA 14, the UE 10 still needs to learn the IPv4 HoA and the IPv6 HNP. This is done with normal IP information configuration methods. The normal automated method is the use of the Dynamic Host Configuration Protocols, DHCPv4 [see "Dynamic Host Configuration Protocol", R. Droms, IETF RFC2131] in IPv4, and in IPv6 either a stateless DHCPv6 method [see "IPv6 Stateless Address Autoconfiguration", S. Thomas, IETF RFC2462], or a stateful DHCPv6 method [see "Dynamic Host Confguration Protocol for IPV6", R. Droms, IETF RFC3315]. Thus, as shown in FIG. 1, at step 104 the MAG 12 informs the UE 10 that it has successfully attached to the access network, and the UE 10 initiates the DHCP procedure by sending (step 105) a DHCP discovery message. The MAG 12 acts a DHCP relay and simply relays all DHCP packets between the UE 10 and the DHCP server in the home network (normally in the LMA 14, as shown in FIG. 1). The exchange of messages includes a DHCP offer (106), a DHCP request (107) and a DHCP acknowledgement (108).

After registration the LMA 14 intercepts all downlink packets addressed to the UE 10 and tunnels them to the MAG 12, which, in turn, de-capsulates them and delivers them to the UE 10. Uplink packets of the UE 10 are encapsulated by the MAG 12, tunnelled to the LMA 14, where they are de-capsulated and routed further based on the destination address of the packet.

When the UE 10 needs to refresh its IPv4 or IPv6 address (for example due to a timeout) it sends a DHCP refresh request (109) which is relayed to the LMA 14 and receives back a DHCP acknowledgement (110)

When a UE moves and attaches to the access network via a new MAG, the new MAG sends an update of location to the LMA in the form of a PBU message. The LMA acknowledges the receipt of the message by sending a PBA and redirects the tunnel to the new MAG. Note that IP address assignment is performed only once.

When the DHCPv4 and/or DHCPv6 method are used, the PMIPv6 protocol requires the DHCP server to be situated at the LMA because this is where the protocol dictates that all the required DHCP information is sent to. This means that after normal PMIPv6 registration the MAG and LMA still need to pass DHCP messages between each other every time the UE sends and resends the DHCP messages to the MAG. This is a waste of network resources.

In addition, when the MAG and the LMA are part of different subnets (which is normally the case), the LMA cannot know the default gateway addresses of the MAG domain, and is thus configured to send its own default gateway addresses. Later on, if the connection from the UE to the MAG is not a tunnel (i.e. the default gateway of the UE is not setup in such a way that all traffic goes via a point-to-point connection), then the UE sets up the default gateway according to the information it has received via the DHCP signaling. Because the LMA sends default router addresses which are only valid inside the LMA's subnet, and not in the MAG's subnet, the UE will set up a default gateway address that does not work. This is because the Address Resolution Protocol (ARP) will fail for the default gateway address configured in the UE. This means that the UE will not be able send packets outside its working domain.

The IETF has published an Internet Draft entitled 'IPv4 Support for Proxy Mobile IPv6' (see: draft-ietf-netlmm-pmip6-ipv4-support-06.txt) in which it is proposed to co-locate either the DHCP server or a DHCP relay agent and the MAG. In the case of the DHCP server, this can help to reduce the amount of signalling required provided that the DHCP server has all the required and up-to-date DHCP configuration information. However, there will be many situations where the UE's home operator LMA is not one that is known to the DHCP server, or where the DHCP configuration information has changed and needs to be up-dated. In either of these situations the information at the DHCP server co-located with the MAG would need to be up-dated or re-configured. A further problem arises because all the DHCP servers that are co-located with MAGs in an IPv6 domain have to be configured with the same set of DHCP option values to ensure that a UE will receive the same configuration values over any access links to the domain. Thus updating this information becomes a major task. In the case of the DHCP relay agent being co-located with the MAG, the DHCP signalling will still need to travel to/from the LMA.

The present invention has been conceived with the foregoing in mind. Although the invention is described in relation to DHCP, it will be appreciated that the principles could be applied to other existing or yet to be defined protocols for providing configuration information to a mobile terminal in a telecommunication network.

SUMMARY

According to a first aspect of the present invention, there is provided a Mobile Access Gateway (MAG) node of an IP network. The MAG node comprises a server for providing configuration information. The server includes a memory for storing configuration information, and a processing unit configured to generate a request for configuration information associated with a mobile terminal that has attached to the network. The server caches the configuration information in the server memory, and includes one or more items of configuration information from the cached information in a message to be sent to the mobile terminal.

It is an advantage that the MAG does not have to relay requests for configuration information, but can simply provide the information directly to the mobile terminal. This significantly reduces the amount of signaling required.

The configuration information may comprise DHCP information and include an IPv4 Home Address, and an IPv6 Home Network Prefix, HNP for the mobile terminal.

Preferably, the processing unit is configured to generate the request for configuration information in response to a request from the mobile terminal to attach to the network. The processing unit is preferably also configured to include one or more items of configuration information from the cached information in a message sent to the mobile terminal in response to a subsequent request from the mobile terminal.

The processing unit may also be configured to identify un-cached configuration information requested by the mobile terminal, and to generate a request for provision of the un-cached configuration information.

Preferably, the MAG is configured to send the request for provision of configuration information to an external database. The request for provision of configuration information may be contained in a Proxy Binding Update message sent to a Local Mobility Anchor node and the requested configuration information may be contained in a Proxy Binding Acknowledgement message received from the Local Mobility Anchor node. Alternatively, the MAG may be configured to send the request for provision of configuration information to the external database as a request separate from a binding registration for the mobile terminal.

The configuration information may be provided in the form of a mobility option comprising a DHCP options field.

The processing unit may be further configured to include one or more addresses of other Mobile Access Gateway nodes in the network having servers for providing configuration information in a message to the mobile terminal. The addresses may be IPv6 link-local addresses of the other MAG nodes.

The MAG node may be configured to ignore a first DHCP Request from the mobile terminal and to provide a DHCP server address to the mobile terminal in response to a DHCP Discovery message from the mobile terminal sent to a broadcast address.

Alternatively, the MAG node may be configured to intercept all DHCP Request messages from the mobile terminal, to ignore the destination address and treat the message as a DHCP Request destined for its own DHCP server.

Alternatively, the MAG may be configured to set the address of its DHCP server to be a broadcast address.

According to a second aspect of the present invention there is provided a method of providing configuration information to a mobile terminal. The method comprises the steps of: receiving a request from the mobile terminal to attach to an IP network via a MAG node; generating and sending a request from the MAG node for the provision of configuration information associated with the mobile terminal; obtaining the requested configuration information; and caching the configuration information at the MAG node.

The method may further comprise receiving at the MAG a request from the mobile terminal for at least an item of configuration information, and providing the requested item or items of configuration information to the mobile terminal from the stored configuration information in the MAG.

DETAILED DESCRIPTION

Figure 1:
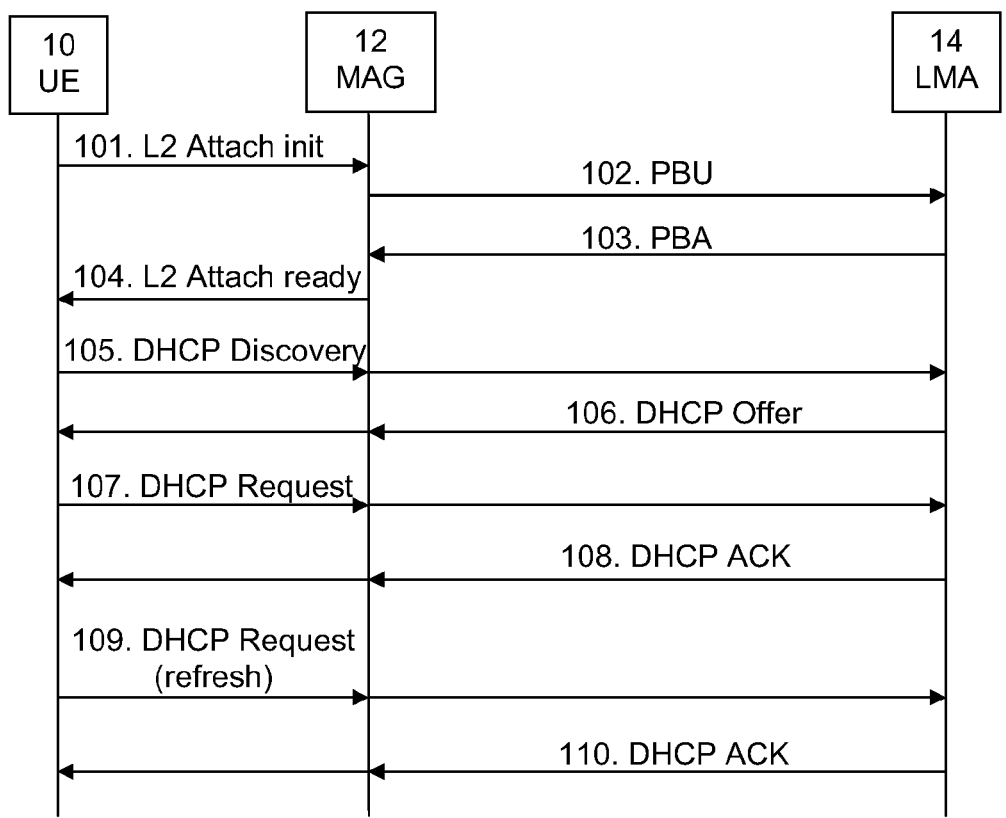
FIG. 1 illustrates the exchange of messages between a UE, MAG and LMA in current usage of DHCP in a PMIP domain.
Figure 2:
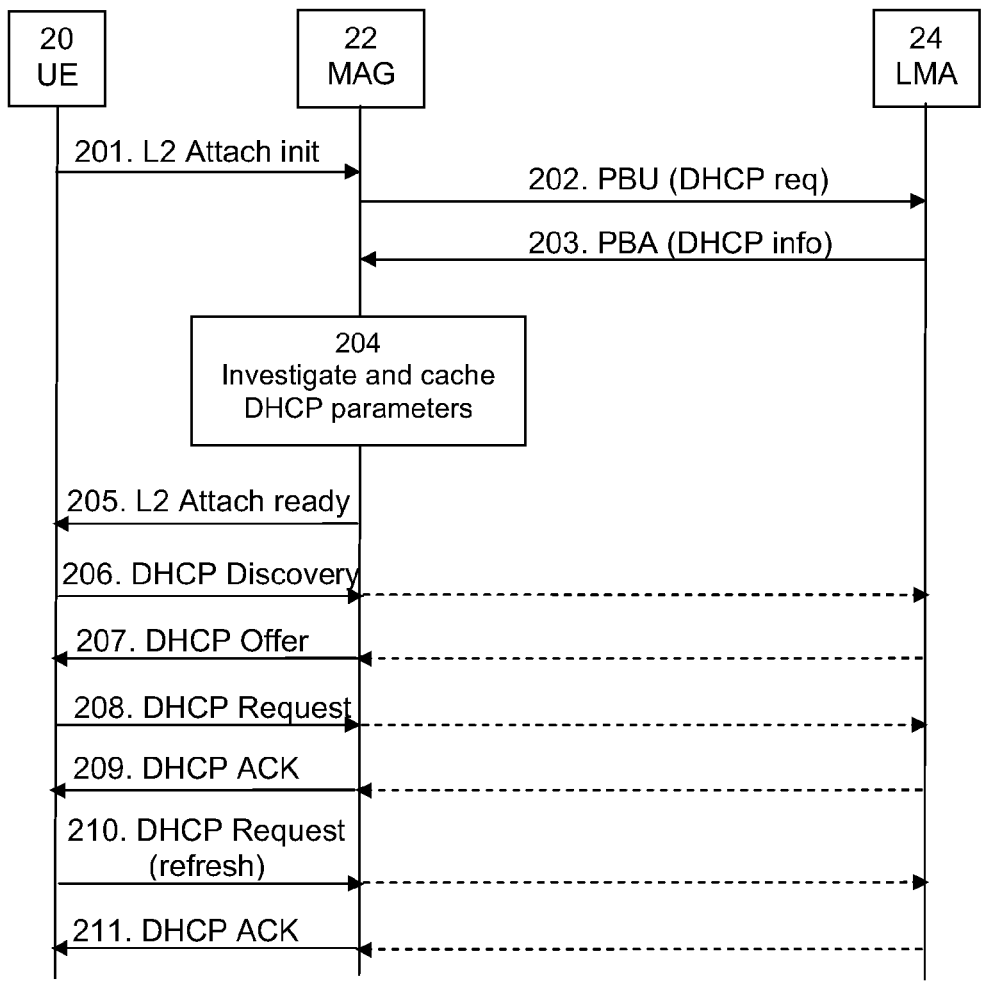
FIG. 2 illustrates the exchange of messages between a UE, MAG and LMA in an embodiment using DHCP in a PMIP domain.

FIG. 2 illustrates the exchange of messages between a UE 20, MAG 22 and LMA 24. All the redundant signals of the existing established mechanism, as shown in FIG. 1, are indicated by broken lines in FIG. 2. This shows that the required DHCP signaling is substantially reduced. The principal way that this reduction is achieved is by using the MAG 22 as a DHCP server so that it can provide the DHCP configuration information directly to the UE 20. However, unlike the system described in the aforementioned IETF Internet Draft, the DHCP server is not simply co-located with the MAG 22. In order for the MAG 22 to act as a DHCP server, it needs to acquire the necessary DHCP information. In the example shown in FIG. 2, this is done in the PMIP registration phase. After the UE 20 has, at step 201, initiated an attempt to attach to the access network via the MAG 24, the MAG 24 sends, at step 202 a PBU message to the LMA 24 of the UE's home operator, which also includes a request for the LMA 24 to provide DHCP configuration information for the UE 20. This is achieved by defining a new mobility option (see below) which indicates to the LMA 24 that the MAG 22 is requesting DHCP information to be included in a PBA message.

The initial PBU message sent, at step 202, from the MAG 22 to the LMA 24 contains a basic set of DHCP options requested (generally these will be specified/requested by the UE 20). The basic set contains options such as: subnet mask, broadcast address, router, domain name, domain name server, and host name. Windows DHCP clients might also request certain Windows specific options e.g. NETBIOS options. The LMA 24 sends a response in the form of a PBA at step 203, which includes (at least) the requested set of DHCP options. At step 204 the MAG 22, after receiving the PBA, investigates the parameters contained in the returned DHCP options set and caches any information it may need for responding to further inquiries or requests from the UE 20. It should be noted that some information might not be cacheable.

Also in step 204, if the PBA message sent at step 203 contains a DHCP Router option, the MAG 22 must substitute every address with a local gateway address. The local gateway address may either be the address of the MAG 22 itself or the address of another node in the MAG's domain which will act as a default gateway.

Figure 4:
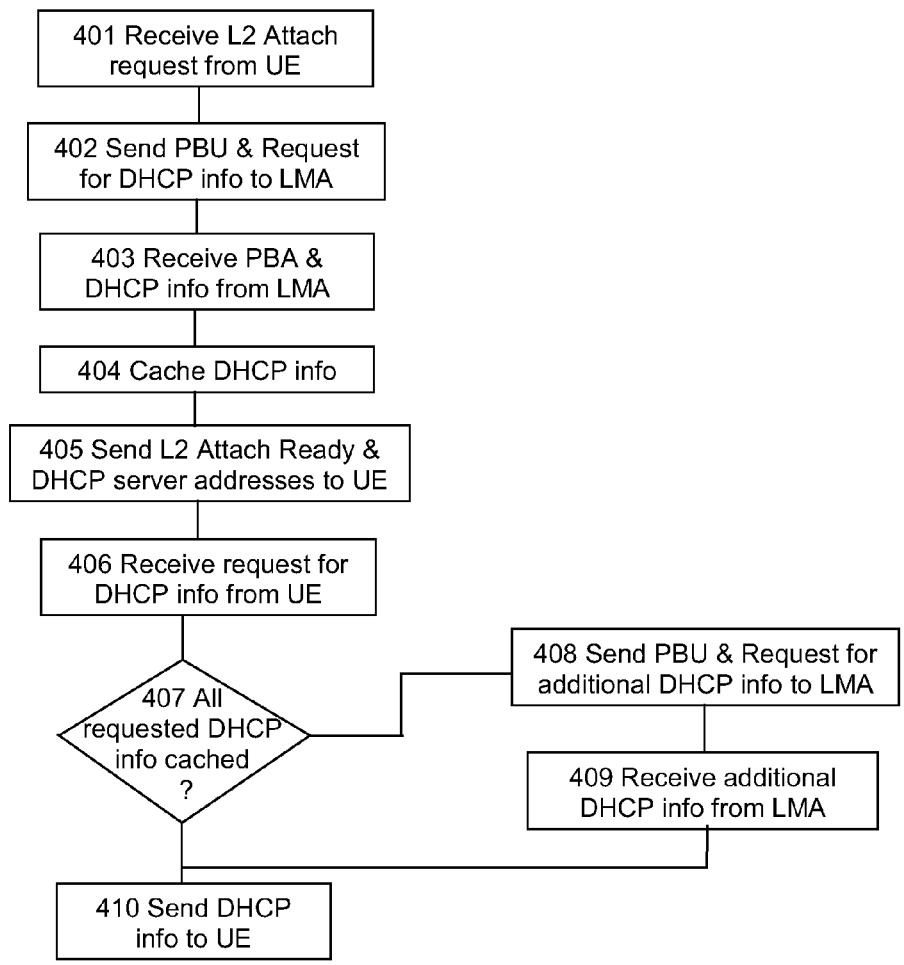
FIG. 4 is a flow diagram illustrating the method steps of a method of providing DHCP information to a UE.

At step 205 the MAG 12 informs the UE 20 that it has successfully attached to the access network, and as before (see FIG. 1) the UE 20 initiates the DHCP procedure by sending (step 206) a DHCP discovery message. Now the MAG 22, configured as a DHCP server, and having cached the relevant DHCP information for the UE 20 can respond directly with a DHCP offer to the UE 20 as shown at step 207. Also, the other messages exchanged such as the DHCP request (step 208), DHCP acknowledgements (steps 209, 211) and DHCP refresh request (step 210) only need to be exchanged between the UE 20 and the MAG 22. However, if the UE 20 has requested a DHCP parameter that the MAG 22 does not have cached, the MAG 22 can request additional information from the LMA 24 by sending a new, or additional, PBU message to the LMA 24, which will respond with an additional PBA (this step is not shown in FIG. 2, but is shown in FIG. 4 and is explained further below).

Note that in FIG. 2, as in FIG. 1, it is assumed that the DHCP information is provided to the MAG 22 by the LMA 24, and this is done as part of the PMIP binding registration. In many cases this will be where the MAG obtains the DHCP information, but there may be situations where the DHCP information is provided to the MAG from a different source. In general, DHCP configuration information is stored in an external database, which may be the LMA, but could also be a separate DHCP server, or, for example, an Authentication, Authorization and Accounting (AAA) server. In that case the MAG 22 would be configured to send a request for provision of the DHCP information to the separate DHCP server and not to the LMA 24, and the request would be a separate and additional procedure to the binding registration shown in FIG. 2 at steps 201-204. However, PMIPv6 does not currently support a mechanism that would enable the LMA to tell the MAG where the DHCP server is located (or the address of the DHCP server) when this is not at the LMA itself. In that case another mechanism is required (for example an AAA mechanism) by which the MAG can learn address of the database from which it can acquire the DHCP information. A different transport mechanism, such as User Datagram Protocol (UDP) or Transmission Control Protocol (TCP) might be used to for this.

The first time the UE 20 registers with a network using DHCP, because it does not know the specific address of a DHCP server, it sends (as at step 206) the DHCP Discovery message to a broadcast address so that any DHCP server can receive that message. Then, the DHCP server that receives the DHCP Discovery message will answer the UE 20 (as at step 207) with a DHCP Offer. At this point the DHCP server, which in this case is in the MAG 22, includes the server address (i.e. its own unicast address) with this message. Thereafter, the UE 20 uses this server address as a destination address for DHCP Requests (such as at step 208). Also, when the UE 20 re-registers, it will send a new DHCP Request message for this purpose to the DHCP server in the MAG 22 using the DHCP server address it was provided with (at step 207). If for some reason this DHCP server destination is unreachable and the UE does not receive an answer, it will start the DHCP process from the beginning by sending a new DHCP Discovery message (as at step 206) to the broadcast address to find a new DHCP server.

When the UE 20 attaches to a new network it must send any DHCP Discovery and/or DHCP Request to the new MAG to which it attaches. However, the UE 20 will use the DHCP server address that it has already been provided with when it was attached to the old MAG for sending its first DHCP Request to the new MAG. The UE 20 was provided with the address of the DHCP server in the old MAG that it was previously attached to and to start with it will not know that it needs to discover a new DHCP server address for the new MAG. Different MAGs will use different addresses, and provided that the DHCP server address of a MAG provided to the UE is not the MAG's global IP address, the first DHCP Request sent by the UE will not reach its destination. The new MAG may be configured in a number of different ways to deal with this situation. One possibility is that the first DHCP Request is just ignored and therefore the UE will not receive a reply. In that case it will start the DHCP process again from the beginning by sending a DHCP Discovery (as at step 206) to a broadcast address so that it can then learn the new MAG's address. Alternatively, the new MAG could be configured to intercept all the DHCP Request messages, to ignore the destination address and treat the message as a DHCP Request destined for its own DHCP server. Another possibility might be for the MAGs to set the addresses of their DHCP servers to be broadcast addresses. This would mean that the UE would broadcast every DHCP message rather than sending it to a unicast address.

In the case of IPv6 this problem need not arise as all the MAGs' DHCP server addresses can use the same link-local address towards the UE. Therefore, the DHCPv6 server address will always remain the same in any network. PMIPv6 specifies a way for the LMA 24 to dictate the IPv6 link-local addresses of the MAGs. This mechanism and these link-local addresses could be used by the MAGs to construct the IPv6 server addresses for DHCPv6 messages. In that case, when the UE attaches to a new access network DHCP messages sent to an IPv6 link-local address of a DHCP server in a MAG in the old access network will not get through. PMIPv4 does not specify link-local addresses (and PMIPv6 specifications do not specify a way to unify the IPv4 MAG addresses between MAGs). So when only IPv4 addresses can be used, the global addresses of the MAGs may be used. In that case, as described above, when the UE 20 attaches to a different access network it will need to learn the address of a DHCP server in the new access network for it to send DHCP messages to. It is important that the DHCP Server identifier used by the MAG is carefully configured so that it specifies the same link-local address (for IPv6), and it is also important that the MAG's global IP address is not used, because otherwise the UE's DHCP Request message will be sent through to the old MAG when it is attaching to a new MAG.

Figure 3:
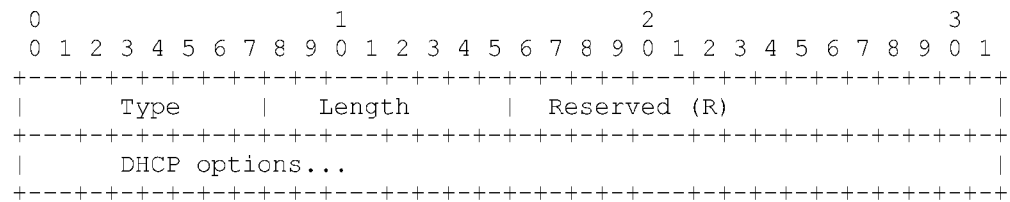
FIG. 3 illustrates a configuration of a mobility option for use in messages by which DHCP configuration information can be acquired by a MAG.

FIG. 3 illustrates a configuration of a new mobility option by which DHCP configuration information is acquired by the MAG. In this mobility option, the Type field has still to be determined. The Type field is used to specify a Type code allocated by IANA to indicate a standard type of mobility option. At some time in the future this mobility option may be allocated a Type code.

The Length field is an 8-bit unsigned integer indicating the length of the option in octets, excluding the type and length fields. This integer value must be set to 2+n where n is the total length of the DHCP options field in octets. The Reserved (R) 16-bit field is unused for now. However the value must be initialized to 0 by the sender and must be ignored by the receiver. The DHCP Options field contains the DHCP options in the format described in RFC2132 [see "DHCP Options and BOOTP Vendor Extensions", S. Alexander, IETF RFC2132,].

FIG. 4 is a flow diagram illustrating the method steps of providing DHCP information to a UE accessing an IP network. At step 401 a request from the UE to attach to the network is received at a MAG; At step 402 the MAG sends a PBU request to the LMA. The PBU request includes a request to be provided with DHCP information in relation to the UE. At step 403, the MAG receives a PBA response from the LMA, which contains the DHCP information (e.g. in the form of the mobility option defined above and shown in FIG. 3). At step 404, the MAG caches the UE's DHCP information. At step 405, the MAG completes the binding attachment of the UE by sending the L2 attach ready message, as shown in FIGS. 1 and 2.

Figure 5:
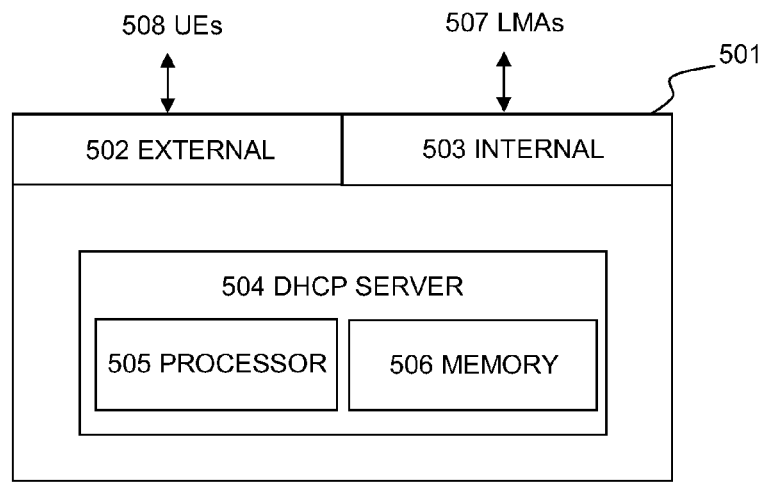
FIG. 5 is a schematic diagram of an embodiment of a MAG node.

Subsequently, at step 406, the MAG receives a request from the UE to be provided with certain DHCP information. This might be in the form of a DHCP Discovery message sent by the UE, if it is registering for the first time (as at step 205 in FIG. 2), or it may be a later request (such as at step 207 in FIG. 2). At step 407, the MAG determines if it has all the requested DHCP information already cached. If it has, then it can proceed directly to step 410 and provide the requested DHCP information to the UE. If the requested information is not cached at the MAG, then at step 408 it sends a further PBU to the LMA to request the missing/additional DHCP information, and at step 409 it receives this from the LMA (again, for example, in the mobility option format). The MAG can then proceed to step 410 and provide the requested DHCP information to the UE FIG. 5 is a schematic diagram of an embodiment of a MAG node 501. As shown the MAG node 501 includes an external transceiver interface 502 through which messages are sent and received to/from UEs 508 accessing the network, and an internal transceiver interface 503 through which messages are sent and received to/from other network nodes such as the UEs' LMAs. The MAG 501 also includes a DHCP server 504 having a memory 506 in which DHCP information relating to a UE can be cached. The DHCP server also has a processing unit 505. The processing unit 505 generates the requests for DHCP information that are sent to the LMAs 507 as well as the messages that are sent back to the UEs 508 that include DHCP information that the UE has requested, either as part of the UE attachment process or in response to a subsequent request from the UE.

The invention claimed is:

1. A Mobile Access Gateway node of an IP network, the Mobile Access Gateway node comprising:
    a server configured to provide configuration information, said server including a server memory configured to store configuration information, and a processing unit configured to generate a request for configuration information associated with a mobile terminal that has attached to the network, to cache the configuration information in the server memory, and to include one or more items of configuration information from the cached information in a message to be sent to the mobile terminal;
    wherein the configuration information comprises Dynamic Host Configuration Protocol (DHCP) information and includes an IPv4 Home Address, and an IPv6 Home Network Prefix (HNP) for the mobile terminal;
    wherein the processor is configured to ignore a first DHCP Request sent from the mobile terminal using a unicast address for a server of another Mobile Access Gateway and to provide a DHCP server address to the mobile terminal in response to a DHCP Discovery message sent from the mobile terminal using a broadcast address for multiple DHCP servers.

2. The Mobile Access Gateway node of claim 1 wherein the processor is configured to intercept all DHCP Request messages from the mobile terminal, to ignore a destination address and treat the message as a DHCP Request destined for its own DHCP server.

3. The Mobile Access Gateway node of claim 1 wherein said processing unit is configured to generate said request for configuration information in response to a request from the mobile terminal to attach to the network.

4. The Mobile Access Gateway node of claim 3 wherein said processing unit is configured to include one or more items of configuration information from the cached information in a message sent to the mobile terminal in response to a subsequent request from the mobile terminal without generating a request for the one or more items of configuration information for transmission outside the Mobile Access Gateway node responsive to the subsequent request from the mobile terminal.

5. The Mobile Access Gateway node of claim 4 wherein the processing unit is configured to identify un-cached configuration information requested by said mobile terminal in a second subsequent request from the mobile terminal, and to generate a request for provision of said un-cached configuration information for transmission outside the Mobile Access Gateway node responsive to the second subsequent request from the mobile terminal.

6. The Mobile Access Gateway node of claim 5, wherein the processing unit is configured to send the request for provision of said un-cached configuration information to an external database outside the Mobile Access Gateway node.

7. The Mobile Access Gateway node of claim 6 wherein the request for provision of configuration information is contained in a Proxy Binding Update message sent to a Local Mobility Anchor node outside the Mobile Access Gateway node and the requested configuration information is contained in a Proxy Binding Acknowledgement message received from the Local Mobility Anchor node outside the Mobile Access Gateway node.

8. The Mobile Access Gateway node of claim 6 wherein the processing unit is configured to send the request for provision of said un-cached configuration information to the external database as a request separate from a binding registration for the mobile terminal.

9. The Mobile Access Gateway node of claim 6 wherein the un-cached configuration information is provided in the form of a mobility option comprising a DHCP options field.

10. The Mobile Access Gateway node of claim 9, wherein the addresses provided are IPv6 link-local addresses of the other Mobile Access Gateway nodes.

11. The Mobile Access Gateway node of claim 9 wherein the processor is configured to set the address of its DHCP server to be a broadcast address.

12. The Mobile Access Gateway node of claim 1 wherein the processing unit is further configured to include one or more addresses of other Mobile Access Gateway nodes in the network having servers configured to provide configuration information in a message to the mobile terminal.

13. The Mobile Access Gateway of claim 1 wherein the processor is configured to intercept all DHCP Request messages from the mobile terminal, to ignore destination addresses of the DHCP Request messages intercepted, and to treat the messages as DHCP Requests destined for the server in the Mobile Access Gateway node.

14. The Mobile Access Gateway of claim 1 wherein the processor is configured to ignore the first DHCP Request sent from the mobile terminal so that the mobile terminal will not receive a reply to the first DHCP Request.

15. A method of providing configuration information to a mobile terminal, the method comprising:
    receiving a request from the mobile terminal to attach to an IP network via a Mobile Access Gateway node;
    generating and sending a request from the Mobile Access Gateway node for provision of configuration information associated with the mobile terminal;
    obtaining the requested configuration information;
    caching the configuration information at the Mobile Access Gateway node;
    ignoring a first Dynamic Host Configuration Protocol (DHCP) Request sent from the mobile terminal using a unicast address for a server of another Mobile Access Gateway and received at the Mobile Access Gateway node; and
    providing a DHCP server address to the mobile terminal in response to a DHCP Discovery message sent from the mobile terminal using a broadcast address for multiple DHCP servers.

16. The method of claim 15 further comprising:
    receiving at the Mobile Access Gateway node a subsequent request from the mobile terminal for at least an item of configuration information; and
    providing the requested item or items of configuration information to the mobile terminal from the stored configuration information in the Mobile Access Gateway node without generating a request for the requested item or items of configuration information for transmission outside the Mobile Access Gateway node responsive to the subsequent request from the mobile terminal.

17. The method of claim 16 further comprising:
    identifying un-cached configuration information requested by the mobile terminal in a second subsequent request from the mobile terminal; and
    generating and sending a request from the Mobile Access Gateway node for provision of said un-cached configuration information wherein the request from the Mobile Access Gateway is sent outside the Mobile Access Gateway node responsive to the second subsequent request from the mobile terminal.

18. The method of claim 15 wherein the request for the provision of configuration information is sent to an external database outside the Mobile Access Gateway node.

19. The method of claim 18 wherein the request for provision configuration information is sent to the external database separately from a binding registration for the mobile terminal.

20. The method of claim 19 wherein the configuration information is provided in the form of a mobility option comprising a DHCP options field.

21. The method of claim 18 wherein the request for the provision of configuration information is sent to a Local Mobility Anchor node associated with the mobile terminal.

22. The method of claim 21, wherein the request for provision of configuration information is sent in a Proxy Binding Update message, and the requested configuration information is provided in a Proxy Binding Acknowledgement.

23. The method of claim 15, further comprising:
    sending to the mobile terminal addresses of other Mobile Access Gateway nodes in the network having configuration information servers.

24. The method of claim 23, wherein the addresses provided are IPv6 link-local addresses of the other Mobile Access Gateway nodes.

25. The method of claim 15 further comprising:
    intercepting at the Mobile Access Gateway node all DHCP Request messages from the mobile terminal,
    ignoring destination addresses of the DHCP Request messages received, and
    treating the messages as DHCP Requests destined for a DHCP server in the Mobile Access Gateway node.

26. The method of claim 15 further comprising:
    setting an address of a configuration information server in the Mobile Access Gateway node to be a broadcast address.

27. The method of claim 15 wherein ignoring the first DHCP Request comprises ignoring the first DHCP Request sent from the mobile terminal so that the mobile terminal will not receive a reply to the first DHCP Request.

28. A method of providing configuration information to a mobile terminal, the method comprising:
    receiving a request from the mobile terminal to attach to an IP network via a Mobile Access Gateway node;
    generating and sending a request from the Mobile Access Gateway node for provision of configuration information associated with the mobile terminal wherein the request for the provision of configuration information is sent to a Local Mobility Anchor node associated with the mobile terminal;
    obtaining the requested configuration information;
    caching the configuration information at the Mobile Access Gateway node;
    intercepting at the Mobile Access Gateway node all Dynamic Host Configuration Protocol (DHCP) Request messages sent from the mobile terminal to a unicast address for a server of another Mobile Access Gateway,
    ignoring destination addresses of the DHCP Request messages received at the Mobile Access Gateway node that were sent to a unicast address for a server of another Mobile Access Gateway, and
    treating the messages that were sent to a unicast address for a server of another Mobile Access Gateway as DHCP Requests destined for a DHCP server in the Mobile Access Gateway node.

29. The method of claim 28, wherein the request for provision of configuration information is sent in a Proxy Binding Update message, and the requested configuration information is provided in a Proxy Binding Acknowledgement.

* * * * *

UNITED STATES PATENT AND TRADEMARK OFFICE
CERTIFICATE OF CORRECTION

PATENT NO. : 8,942,246 B2
APPLICATION NO. : 13/148515
DATED : January 27, 2015
INVENTOR(S) : Mahkonen et al.

Page 1 of 1

It is certified that error appears in the above-identified patent and that said Letters Patent is hereby corrected as shown below:

On the Title Page, in Item (75), under "Inventors", in Column 1, Lines 2-3, delete "Martti Kuparinen," and insert -- Martti Kuparinen, Deceased, --, therefor.

In the Specification

In Column 1, Line 41, delete "draft-ieff-" and insert -- draft-ietf- --, therefor.

In Column 4, Line 63, delete "MAG 24, the MAG 24" and insert -- MAG 22, the MAG 22 --, therefor.

In the Claims

In Column 9, Line 9, in Claim 13, delete "Gateway" and insert -- Gateway node --, therefor.

In Column 9, Line 15, in Claim 14, delete "Gateway" and insert -- Gateway node --, therefor.

Signed and Sealed this
Seventh Day of July, 2015

Michelle K. Lee
*Director of the United States Patent and Trademark Office*